(12) United States Patent
Joo et al.

(10) Patent No.: US 9,367,739 B2
(45) Date of Patent: Jun. 14, 2016

(54) METHOD OF OPERATING AN IRIS RECOGNITION PORTABLE DEVICE AND IRIS RECOGNITION PORTABLE DEVICE

(71) Applicant: Samsung Display Co., Ltd., Yongin (KR)

(72) Inventors: Hye-Jin Joo, Suwon-si (KR); Hee-Soo Yoo, Seoul (KR); Hyo-Shin Kim, Seoul (KR); Mu-Gyeom Kim, Hwaseong-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

(21) Appl. No.: 14/281,419

(22) Filed: May 19, 2014

(65) Prior Publication Data

US 2015/0003691 A1 Jan. 1, 2015

(30) Foreign Application Priority Data

Jul. 1, 2013 (KR) ........................ 10-2013-0076292

(51) Int. Cl.
  *G06K 9/00* (2006.01)
  *G06F 21/32* (2013.01)
  *G06F 21/55* (2013.01)

(52) U.S. Cl.
  CPC ............ *G06K 9/00604* (2013.01); *G06F 21/32* (2013.01); *G06F 21/554* (2013.01); *G06K 9/00597* (2013.01)

(58) Field of Classification Search
  CPC . G06F 21/00; G06K 9/00597; G06K 9/00604
  USPC .................................................. 382/115, 124
  See application file for complete search history.

(56) References Cited

U.S. PATENT DOCUMENTS

| 2008/0272995 A1 | 11/2008 | Sakaguchi et al. |
| 2010/0205667 A1* | 8/2010 | Anderson et al. ................ 726/19 |
| 2014/0029810 A1* | 1/2014 | Barr et al. ....................... 382/118 |
| 2014/0041042 A1* | 2/2014 | Wong et al. ..................... 726/26 |
| 2014/0101768 A1* | 4/2014 | Miller et al. .................... 726/25 |

FOREIGN PATENT DOCUMENTS

| KR | 10-2006-0119077 | 11/2006 |
| KR | 10-2011-0121874 | 11/2011 |
| KR | 10-2012-0020024 | 3/2012 |
| KR | 10-2012-0070457 | 6/2012 |
| KR | 10-2012-0090870 | 8/2012 |
| KR | 10-1205652 | 11/2012 |

* cited by examiner

*Primary Examiner* — Edward Park
(74) *Attorney, Agent, or Firm* — H.C. Park & Associates, PLC

(57) ABSTRACT

A proximity of a second user is sensed while a first user who is a registered user views an iris recognition portable device. Whether the second user is registered is checked according to whether an iris of the second user is recognized. The displayed screen may be altered when the second user is determined to be a non-registered user.

15 Claims, 7 Drawing Sheets

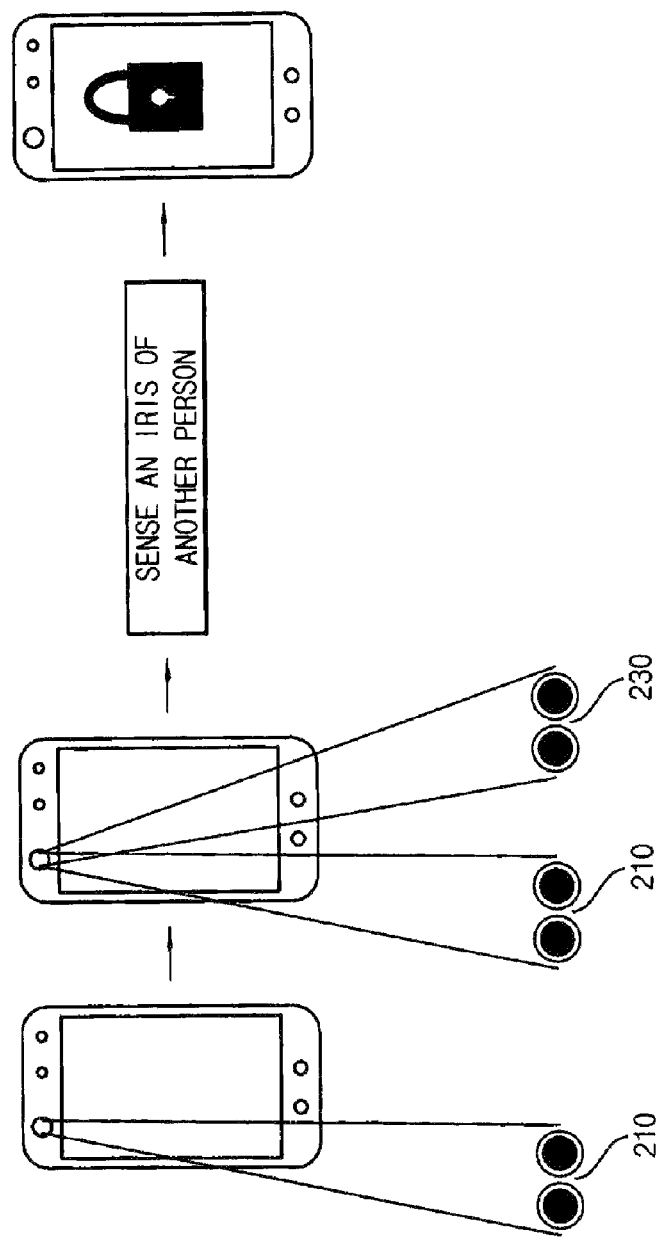

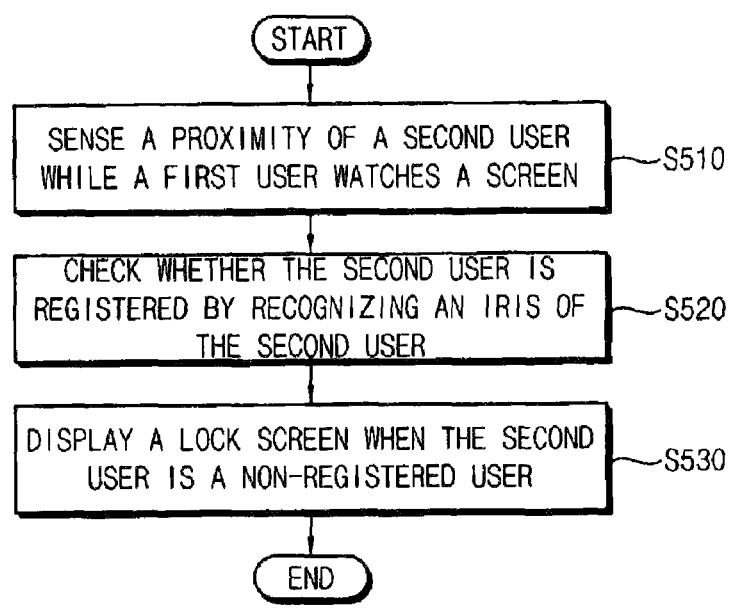

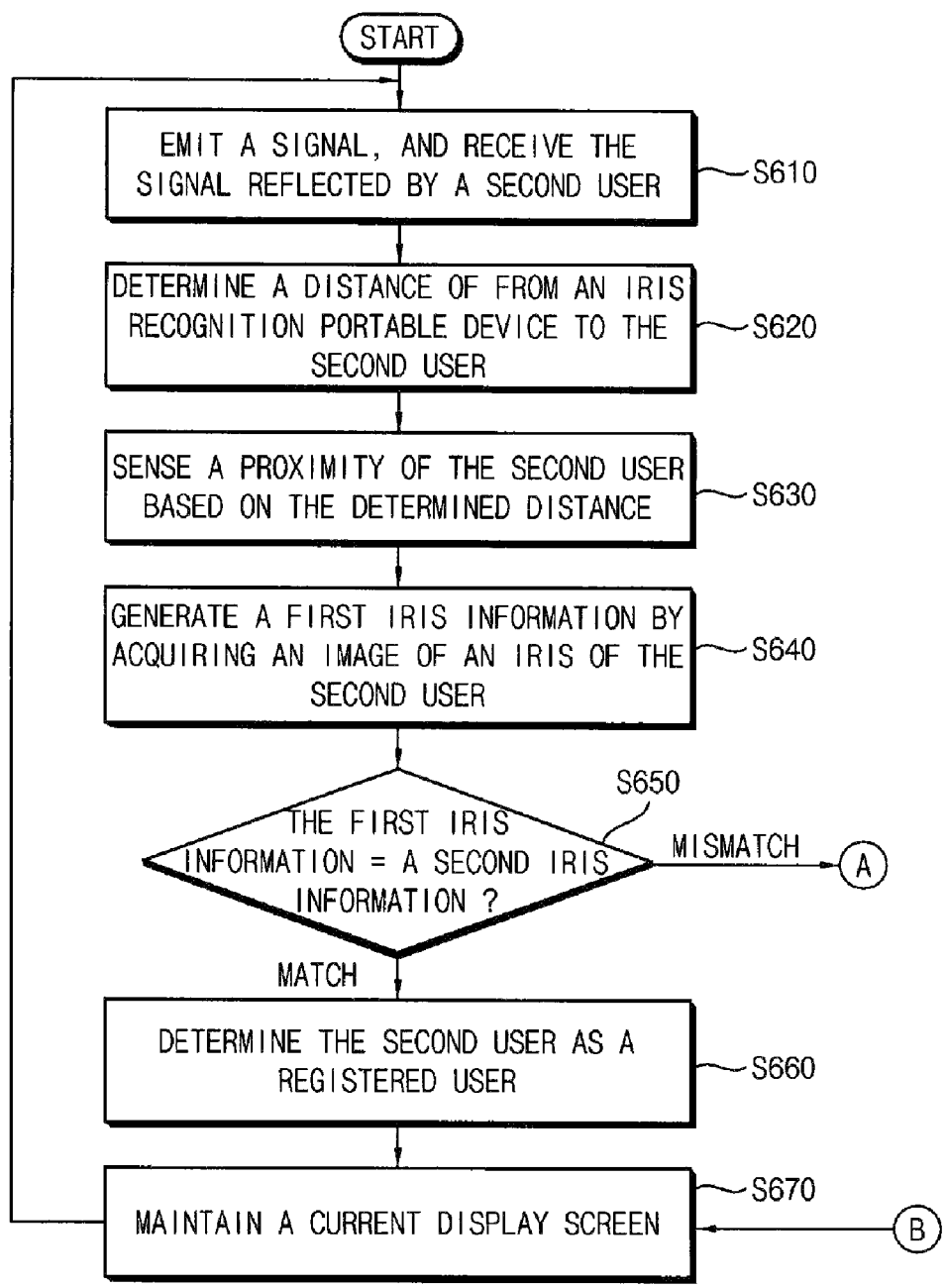

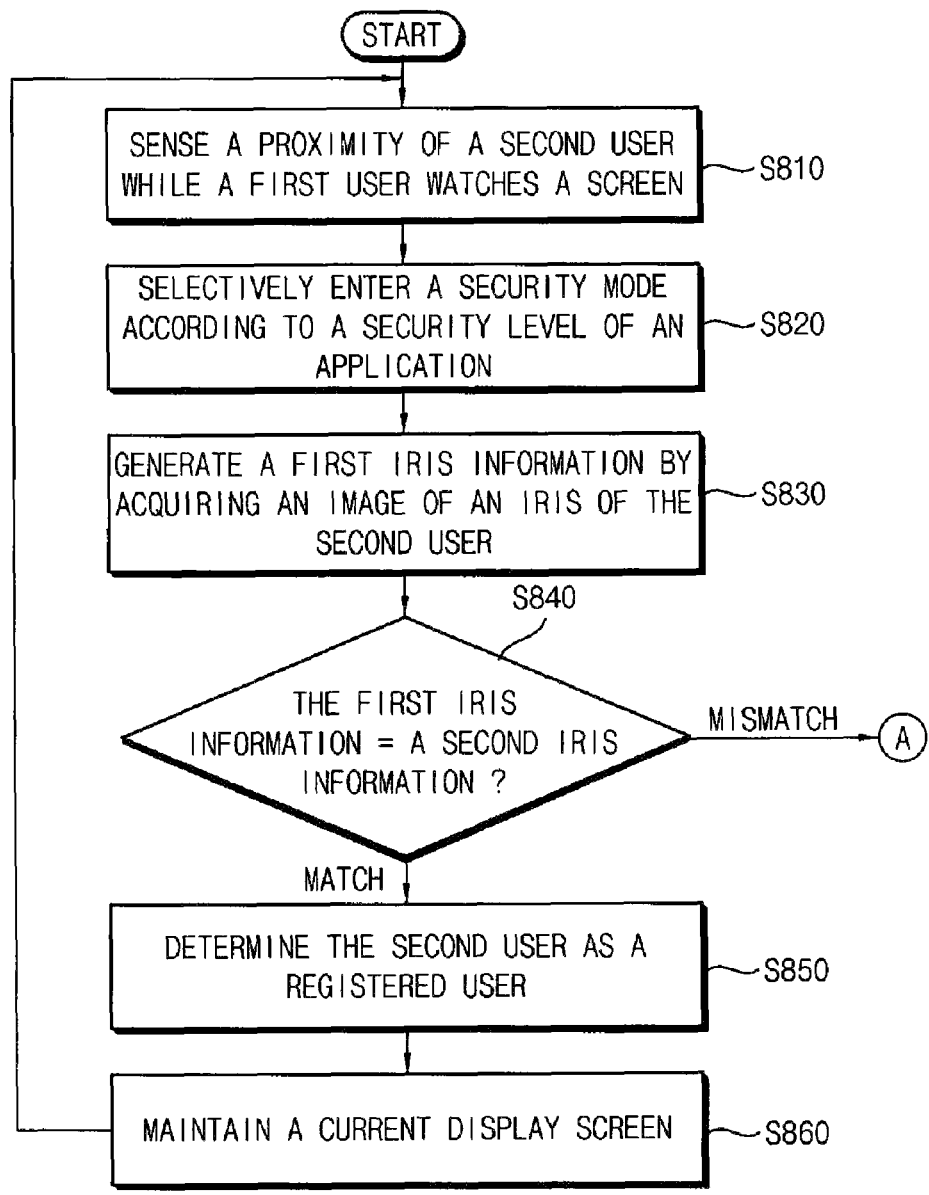

METHOD OF OPERATING AN IRIS RECOGNITION PORTABLE DEVICE AND IRIS RECOGNITION PORTABLE DEVICE

CROSS REFERENCE TO RELATED APPLICATION

This application claims priority under 35 U.S.C. §119 to Korean Patent Application No. 10-2013-0076292, filed on Jul. 1, 2013, the disclosure of which is hereby incorporated by reference herein in its entirety.

BACKGROUND

1. Technical Field

Example embodiments of the inventive concept relate to security techniques. More particularly, example embodiments of the inventive concept relate to methods of operating iris recognition portable devices, and iris recognition portable devices.

2. Description of the Background

When a user uses a display device, a person other than the user may sneak a look at the display device. In particular, when the display device is used for the purpose of viewing a social network service (SNS), mobile banking, personal e-mail, password input, etc., personal information of the user can be leaked to the person other than the user.

There are various methods to prevent direct access to the display device by an unauthorized person. For example, when an unauthorized person tries to use the display device, unauthorized access to the display device can be prevented using a password input method, a fingerprint recognition method, a face recognition method, an iris recognition method, a pattern recognition method, etc. However, when the authorized user operates the display device, these methods cannot prevent a person other than the user from sneaking a look at the personal information displayed on the display device.

SUMMARY

Example embodiments provide a method of operating a device having an iris recognition camera that senses an iris of another person.

Example embodiments provide a device having an iris recognition camera that senses an iris of another person.

According to one aspect of example embodiments, a method of operating a device is provided as follows. A proximity of a second user is sensed while a first user who is a registered user views a display screen of the device. After the proximity of the second user is sensed, whether the second user is a registered user is determined based on an iris of the second user. A currently displayed image is changed if the second user is determined to be a non-registered user.

According to another aspect of example embodiments, a method of operating a device is provided as follows. Whether a second user is within a threshold distance of the device is checked while a first user who is a registered user of the device views a display screen of the device. A security mode is selectively entered according to a security level of an application that is currently being executed by the device when the second user is within the threshold distance.

According to one aspect of example embodiments, a device includes at least one proximity sensor, an iris recognition camera, a control unit, and a display unit. The at least one the proximity sensor senses a proximity of a second user while a first user who is a registered user views an image displayed by the device. The iris recognition camera generates first iris information by acquiring an image of an iris of the second user after the at least one proximity sensor senses a proximity of the second user. The control unit receives the first iris information from the iris recognition camera, and determines whether the second user is a registered user or a non-registered user. The display unit displays a changed image when the second user is determined to be the non-registered user.

BRIEF DESCRIPTION OF THE DRAWINGS

Example embodiments can be understood in more detail from the following description taken in conjunction with the accompanying drawings.

FIG. 3 is a diagram for describing a method of operating an iris recognition portable device in accordance with example embodiments.

FIG. 4 is a flow chart illustrating a method of operating an iris recognition portable device in accordance with example embodiments.

FIGS. 5A and 5B are flow charts illustrating a method of operating the iris recognition portable device in accordance with example embodiments.

FIGS. 6A and 6B are flow charts illustrating a method of operating an iris recognition portable device using a security mode in accordance with example embodiments.

DESCRIPTION OF ILLUSTRATED EMBODIMENTS

Figure 1:
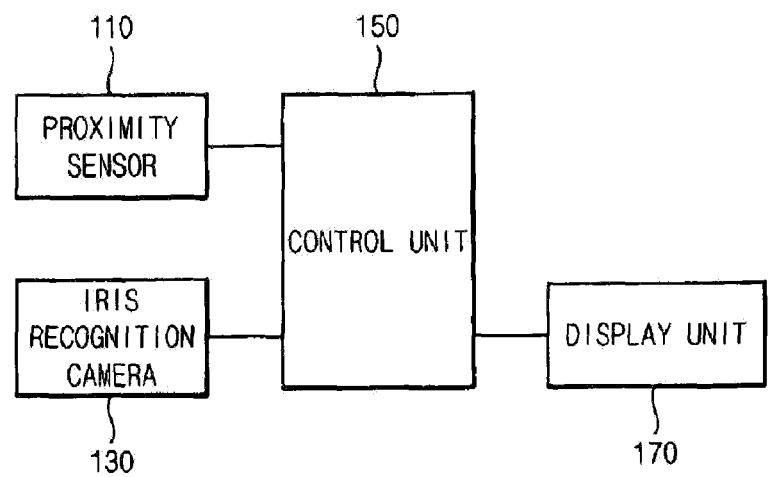
FIG. 1 is a block diagram illustrating an iris recognition portable device in accordance with example embodiments.

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals generally refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the example term "below" can encompass both an orientation of above and below. The apparatus may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
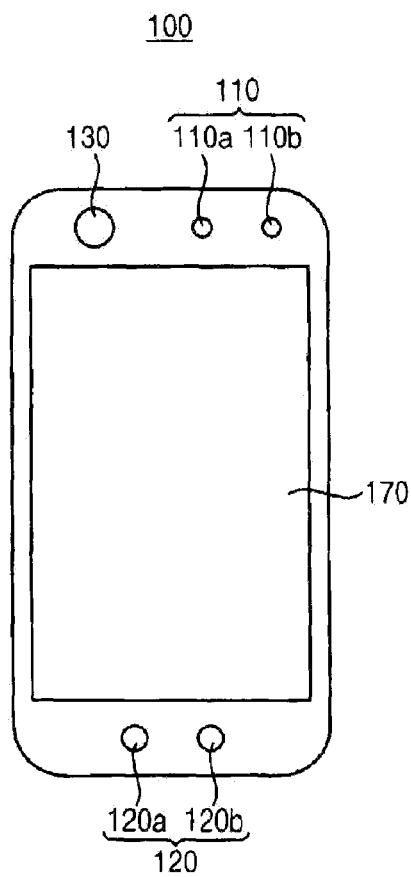
FIG. 2 is a diagram illustrating a smart phone as an example of an iris recognition portable device in accordance with example embodiments.

FIG. 1 is a block diagram illustrating an iris recognition portable device in accordance with example embodiments, and FIG. 2 is a diagram illustrating a smart phone as an example of an iris recognition portable device in accordance with example embodiments.

Referring to FIGS. 1 and 2, an iris recognition portable device 100 may include a proximity sensor 110, an iris recognition camera 130, a control unit 150, and a display unit 170. In some example embodiments, as illustrated in FIG. 2, the iris recognition portable device 100 may be a smart phone 100. In other example embodiments, the iris recognition portable device 100 may be any portable device that is utilized to display sensitive information, including display devices such as a mobile phone, a laptop computer, a tablet computer, a personal digital assistant PDA, a portable multimedia player PMP, a digital camera, a music player, a portable game console, a navigation, or the like. Of course, example embodiments may also be utilized in any device that displays information, regardless of whether it is portable.

As illustrated in FIG. 2, the proximity sensor 110 may be disposed in a top region of the iris recognition portable device 100. Generally, a user of the iris recognition portable device 100 may use the iris recognition portable device 100 while holding the iris recognition portable device 100 in a vertical direction (i.e., the major axis of the iris recognition portable device 100 may be parallel to the vertical direction of the iris recognition portable device 100). In the case where the user holds the iris recognition portable device 100 upright, the proximity sensor 110 may emit and receive a signal in a wide range if the proximity sensor 110 is disposed in the top region of the iris recognition portable device 100.

The proximity sensor 110 may include a signal emission unit 110a and a signal reception unit 110b. The signal emission unit 110a may emit a signal that may subsequently be reflected by a person in the vicinity of the iris recognition portable device 100. The signal reception unit 110b may receive the signal reflected by the person, and may provide the received signal to the control unit 150. In some example embodiments, the proximity sensor 110 may periodically emit and receive the signal.

In some example embodiments, as illustrated in FIG. 2, the iris recognition portable device 100 may further include another proximity sensor 120 disposed in a bottom region of the iris recognition portable device 100. The proximity sensor 120 may include a signal emission unit 120a and signal reception unit 120b. For example, the user of the iris recognition portable device 100 may use the iris recognition portable device 100 while holding the device in a horizontal direction (i.e., the major axis of the device may be parallel to the horizontal direction). In this case, the two proximity sensors 110 and 120 respectively disposed in the top and bottom regions may be located at the right and the left of the iris recognition portable device 100, and thus the proximity sensors 110 and 120 may each emit and receive a signal in a wide range.

The iris recognition camera 130 may be disposed in a top region of the iris recognition portable device 100. The iris recognition camera 130 may generate an iris information by acquiring an image of an iris of a person, and may provide the iris information to the control unit 150. The iris recognition camera 130 may capture an image the iris of the user of the iris recognition portable device 100 in a short distance, and the iris recognition camera 130 may further capture an image an iris of another person around the user in a long distance. The iris recognition camera 130, the control unit 150, or a module(s) in communication with the camera and control unit may determine the iris information based on the acquired image. Because a person of ordinary skill in the art understands how this may be practiced, it is not further discussed here.

The control unit 150 may be connected to the proximity sensor 110 and the iris recognition camera 130. The control unit 150 may receive the reflected signal from the proximity sensor 110, and may determine a distance from the iris recognition portable device 100 to the person that reflected the signal based on the received signal. In addition, the control unit 150 may receive the iris information from the iris recognition camera 130, and may compare the received iris information and an iris information stored in a memory of the iris recognition portable device 100, such as a non-volatile memory device. The non-volatile memory device may be located inside or outside the control unit 150. In some example embodiments, the non-volatile memory device may store an iris information of a user, as well as an iris information of another user permitted by the user.

The display unit 170 may be disposed in the front of the iris recognition portable device 100, and may be connected to the control unit 150. The display unit 170 may change a screen of the display unit 170 in response to the command from the control unit 150. For example, the display unit 170 may be controlled by the control unit 150 to display a user selection window, a lock screen, and the like.

As described above, as the iris recognition portable device 100 in accordance with example embodiments has the proximity sensor 110 and the iris recognition camera 130, the iris recognition portable device 100 may sense the iris of the user, as well as the iris of another person nearby the user.

FIG. 3 is a diagram for describing a method of operating an iris recognition portable device in accordance with example embodiments, and FIG. 4 is a flow chart illustrating a method of operating an iris recognition portable device in accordance with example embodiments.

Referring FIGS. 1 through 4, when a first user 210 views an iris recognition portable device 100, a proximity sensor 110 may sense a proximity of a second user 230 (Step S510). For example, the first user 210 may be a registered user using the iris recognition portable device 100, and the second user 230 may be a non-registered user nearby the iris recognition portable device 100. For example, the proximity sensor 110 may sense the proximity of the second user 230 by emitting a signal using a signal emission unit 110a and by receiving the signal reflected by the second user 230 using a signal receive unit 110b.

When the proximity sensor 110 senses the proximity of the second user 230, the iris recognition portable device 100 may check whether the second user 230 is a registered user by acquiring an image of an iris of the second user 230 (Step S520). For example, the iris recognition camera 130 may generate first iris information by acquiring an image of the iris of the second user 230, and may provide the first iris information to the control unit 150. The control unit 150 may compare the first iris information with second iris information stored in a memory of the iris recognition portable device 100, such as a non-volatile memory device. In some example embodiments, the non-volatile memory device may store iris information of the first user 210. In other example embodiments, the non-volatile memory device may store not only the iris information of the first user 210 but also iris information of one or more users permitted by the first user 210. When the first iris information matches the second iris information, the control unit 150 may determine the second user 230 as a registered user. When the first iris information does not match the second iris information, the control unit 150 may determine the second user 230 as a non-registered user. Both the first iris information and the second iris information may include iris information for the right eye iris only, the left eye iris only, or both the right and left eye irises. In other words, the iris recognition camera 130 may acquire images of the right eye iris only, the left eye iris only, or both the right and left eye irises.

When the second user 230 is determined to be a non-registered user, the display unit 170 of the iris recognition portable device 100 may display a lock screen (Step S530). For example, the display unit 170 may change a screen of the display unit 170 into the lock screen in response to a command of the control unit 150. Accordingly, when the non-registered user approaches the iris recognition portable device 100 and an image of the non-registered user's iris is obtained, the screen of the display unit 170 may be automatically changed into the lock screen, thereby preventing the leak of the personal information of the first user 210.

As described above, in the method of operating the iris recognition portable device 100 in accordance with example embodiments, while the registered user 210 uses the iris recognition portable device 100, the iris recognition portable device 100 may sense the proximity of the non-registered user 230, acquire an image of an iris of non-registered user 230, and may change the screen of the display unit 170 into the lock screen, thereby preventing the leak of the personal information of the registered user 210.

Figure 5B:
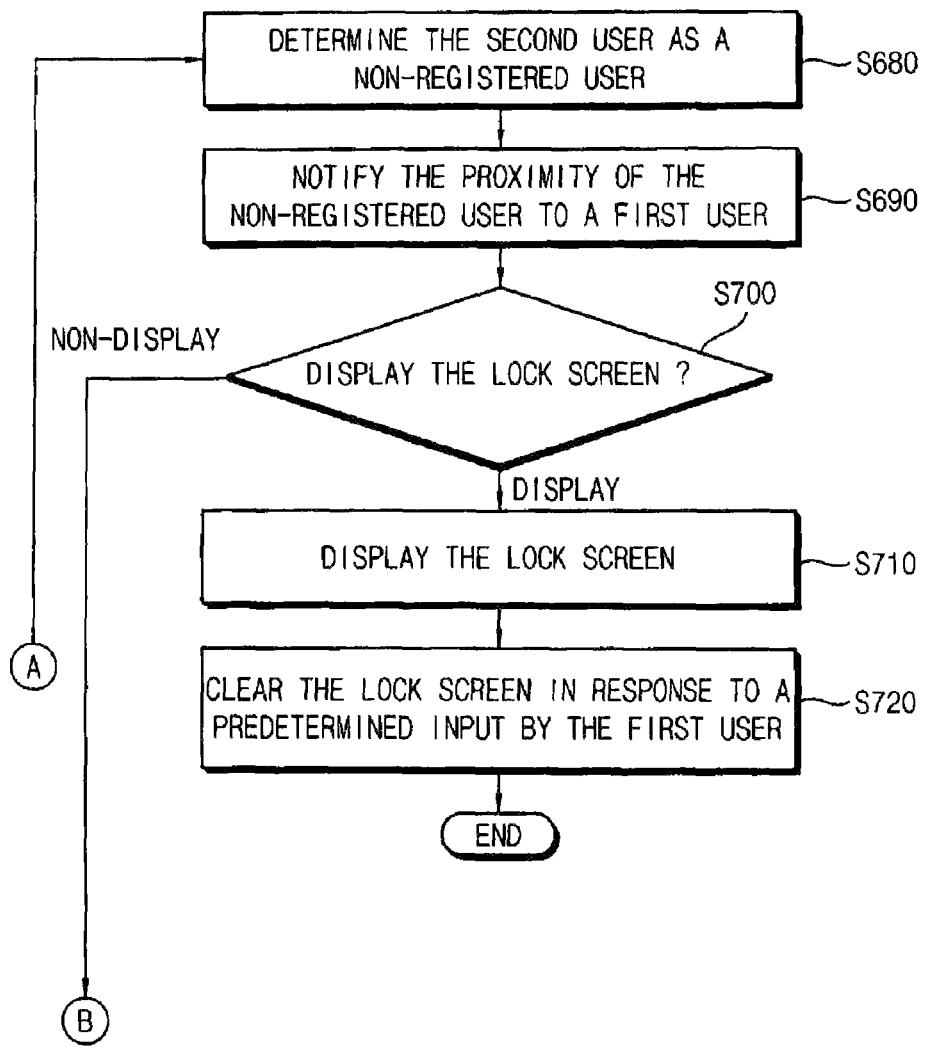

FIGS. 5A and 5B are flow charts illustrating a method of operating the iris recognition portable device in accordance with example embodiments.

Referring to FIGS. 1, 3, 5A, and 5B, while a first user 210 views an iris recognition portable device 100, a proximity sensor 110 may sense a proximity of a second user 230 (Step S610, Step S620 and Step S630).

For example, while the first user 210 views the iris recognition portable device 100, the proximity sensor 110 may emit a signal, and may receive the signal reflected by the second user 230 (Step S610).

The proximity sensor 110 may provide the received signal to a control unit 150, and the control unit 150 may determine a distance from the iris recognition portable device 100 to the second user 230 based on the received signal from the proximity sensor 110 (Step S620). In some example embodiments, the control unit 150 may determine the distance based on time-of-flight (TOF) from a time point of the emission of the signal to a time point of the reception of the signal. For example, when time-of-flight is long, the distance from the iris recognition portable device 100 to the second user 230 may be long, and when time-of-flight is short, the distance from the iris recognition portable device 100 to the second user 230 may be short.

When the distance from the iris recognition portable device 100 to the second user 230 is within a predetermined range, the control unit 150 may determine that the second user 230 is in proximity to the iris recognition portable device 100 (Step S630). In some example embodiments, the predetermined range may be a fixed value. For example, the predetermined range may be determined as the maximum range that the second user 230 can view the display screen of the iris recognition portable device 100. In other example embodiments, the predetermined range may be changed by a user setting of the first user 210.

When the proximity of the second user 230 approaching the iris recognition portable device 100 is sensed, the iris recognition portable device 100 may determine whether the second user 230 is a registered user according to whether an iris of the second user 230 is recognized (Step S640, Step S650, Step S660, Step S680).

For example, when the proximity of the second user 230 is sensed by the proximity sensor 110, the iris recognition camera 130 of the iris recognition portable device 100 may generate first iris information by acquiring an image of an iris of the second user 230 (Step S640).

The iris recognition camera 130 may provide the first iris information to the control unit 150, and the control unit 150 may compare the first iris information of the second user 230 with second iris information stored in the non-volatile memory device (Step S650). The second iris information stored in the non-volatile memory device is iris information of one or more registered users of the iris recognition portable device 100. For example, the non-volatile memory device may store the iris information of the first user 210, as well as iris information of one or more users permitted by the first user 210.

When the first iris information matches the second iris information (Step S650: MATCH), the control unit 150 may determine the second user 230 is a registered user (Step S660). When the second user 230 is determined to be a registered user, a display unit 170 of the iris recognition portable device 100 may maintain a current screen (Step S670). Accordingly, the first user 210 and the second user 230 may view the iris recognition portable device 100 at the same time. The users of which the iris information is stored in the non-volatile memory device may view the iris recognition portable device 100 at the same time.

When the first iris information does not match the second iris information (Step S650: MISMATCH), the control unit 150 may determine the second user 230 to be a non-registered user (Step S680).

When the second user 230 is determined to be a non-registered user, the control unit 150 may notify the proximity of the second user 230 to the first user 210 (Step S690).

In addition, the control unit 150 may control the display unit 170, and the display unit 170 may display a user selection window for the first user 210 to select whether to display a lock screen (Step S700). When the first user 210 selects a non-display of the lock screen in the user selection window (Step S700: NON-DISPLAY), the display unit 170 may not display the lock screen, and may maintain a current screen (Step S670).

When the first user 210 selects a display of the lock screen in the user selection window (Step S700: DISPLAY), the display unit 170 may display the lock screen. For example, the lock screen may be a screen that is previously set by the first user 210. Accordingly, personal information of the first user 210 may be prevented from being leaked to the second user 230 such as a non-registered user.

In one embodiment, after the display unit 170 displays the lock screen, the iris recognition portable device 100 may clear the lock screen in response to a predetermined input from the first user 210 (Step S720). For example, the predetermined input may include a touch of the display unit 170, a continuous double touch of the display unit 170, or the like.

As described above, in the method of operating the iris recognition portable device 100 in accordance with example embodiments, while the first user 210 views the iris recognition portable device 100, when a distance from the iris recognition portable device to the second user is within a predetermined range, the iris recognition portable device 100 may check whether the second user 230 is a registered user according to whether an iris of the second user 230 is recognized. When the second user 230 is a non-registered user, the iris recognition portable device 100 may display the user selection window, and the first user 210 may select whether to display the lock screen. Accordingly, as the lock screen is selectively displayed according to the selection of the first user 210, the first user 210 may select to display the lock screen according to whether the iris recognition portable device 100 displays personal information.

Figure 6B:
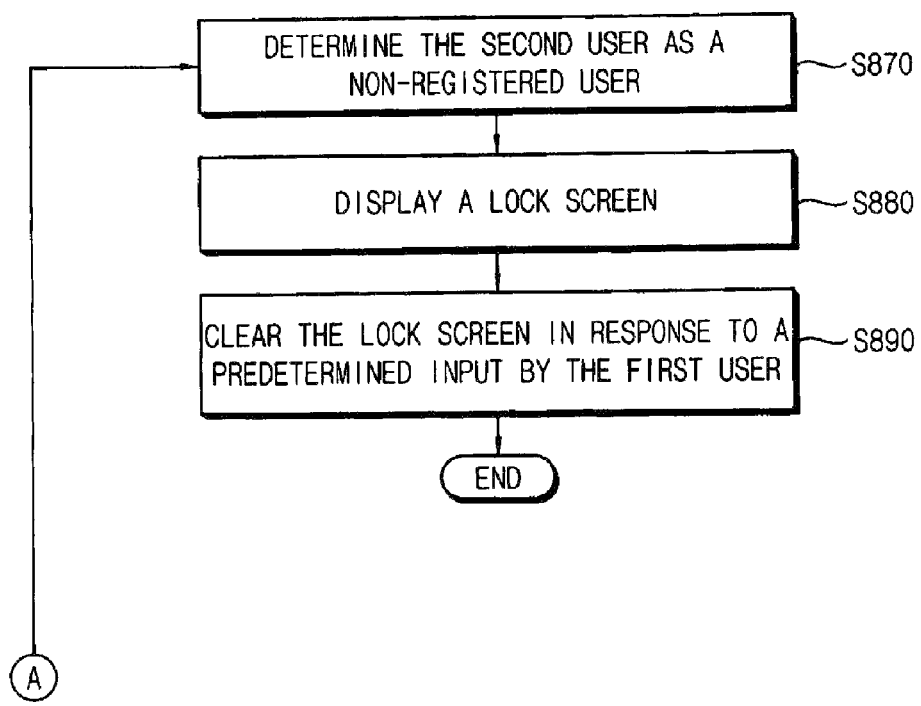

FIGS. 6A and 6B are flow charts illustrating a method of operating an iris recognition portable device using a security mode in accordance with example embodiments.

Referring FIGS. 1, 3, 6A, and FIG. 6B, while a first user 210 views an iris recognition portable device 100, a proximity sensor 110 may sense a proximity of a second user 230 (Step S810).

When the proximity of the second user 230 is sensed, the iris recognition portable device 100 may selectively enter into a security mode according to a security level of an application that is currently executed by the iris recognition portable device 100 (Step S820). In one embodiment, an application of a lower security level may be an application not related to personal information of the first user 210. For example, the application of the lower security level may include a game application, a web surfing application, an operation system of the iris recognition portable device 100, and the like. An application of a higher security level may be the application related to personal information of the first user 210. For example, the application of the higher security level may include an SNS application, a mobile banking application, an e-mail application, and the like. For example, when the iris recognition portable device 100 executes the game application, the iris recognition portable device 100 may not enter into the security mode. When the iris recognition portable device 100 executes the e-mail application, the iris recognition portable device 100 may enter into the security mode. In one embodiment, the security level of the application may be classified into two or more security levels. In example embodiments, the security levels of the respective applications may be set by the first user 210 or a developer of the application.

When the iris recognition portable device 100 enters into the security mode, an iris recognition camera 130 of the iris recognition portable device 100 may generate first iris information by acquiring an image of an iris of the second user 230 (Step S830).

The iris recognition camera 130 may provide the first iris information to the control unit 150, which may compare the first iris information of the second user 230 with second iris information stored in a non-volatile memory device (Step S840).

When the first iris information matches the second iris information (Step S840: MATCH), the control unit 150 may determine the second user 230 is a registered user (Step S850). When the second user 230 is determined to be a registered user, a display unit 170 of the iris recognition portable device 100 may maintain the current screen (Step S860). Accordingly, the first user 210 and the second user 230 may view the iris recognition portable device 100 at the same time. The users of which the iris information is stored in the non-volatile memory device may view the iris recognition portable device 100 at the same time.

When the first iris information does not match the second iris information (Step S840: MISMATCH), the control unit 150 may determine the second user 230 to be a non-registered user (Step S870). When the second user 230 is determined to be a non-registered user, the display unit 170 may display the lock screen (Step S880). Accordingly, personal information of the first user 210 may be prevented from being leaked to the second user 230, or the non-registered user.

In one embodiment, when the display unit 170 displays the lock screen, the iris recognition portable device 100 may clear the lock screen in response to a predetermined input from the first user 210 (Step S890). For example, the predetermined input may include a touch of the display unit 170, a continuous double touch of the display unit 170, or the like.

As described above, in the method of operating the iris recognition portable device 100 in accordance with other embodiment of the present, while the first user 210 views the iris recognition portable device 100, the iris recognition portable device 100 may check whether the second user 230 is a registered user according to whether an iris of the second user 230 is recognized. When the second user 230 is a non-registered user, the iris recognition portable device 100 may selectively enter into a security mode according to a security level of an application that is currently executed by the iris recognition portable device 100. In the security mode, because the iris recognition portable device 100 displays the lock screen, the iris recognition portable device 100 may prevent a leak of the personal information of the first user 210.

Example embodiments of the present invention may be applied to any portable device having a display apparatus. For example, example embodiments may be applied to the mobile phone, the smart phone, the laptop computer, the tablet computer, the personal digital assistant; PDA, the portable multimedia player; PMP, the digital camera, the music player, the portable game console, the navigation, or the like.

In the example embodiments described above, a lock screen may be displayed if the second user is not a registered user. Different screens may, however, be displayed. For example, a registered user may designate another application to be displayed, such as a web surfing application. In another example embodiment, a registered user may designate that a message directed to the non-registered user (i.e., "I see you") be displayed. In yet another example embodiment, the screen may just be blackened so that no image is seen.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method, comprising:
   sensing, while a first user views a display screen of a device, a proximity of a second user, the first user being a registered user of the device;
   determining, after the proximity of the second user is sensed, whether the second user is a registered user of the device based on an iris of the second user;
   displaying, when the second user is determined to be a non-registered user of the device, a user selection window indicating that the first user has an option to select whether to change a currently displayed image; and
   changing the currently displayed image to a lock screen if the first user selects to change the currently displayed screen when the user selection window is displayed.

2. The method of claim 1, wherein determining whether the second user is a registered user comprises:
   generating first iris information by acquiring an image of the iris of the second user;
   comparing the first iris information with a second iris information stored in the device;
   determining the second user to be a registered user when the first iris information matches the second iris information; and
   determining the second user to be a non-registered user when the first iris information does not match the second iris information.

3. The method of claim 2, wherein the second iris information is stored in a non-volatile memory device of the device.

4. The method of claim 3, wherein the non-volatile memory device stores an iris information of the first user and an iris information of another user permitted by the first user.

5. The method of claim 1, further comprising:
   maintaining the image currently displayed on the display screen when the second user is determined to be a registered user.

6. The method of claim 1, further comprising:
   notifying the first user of the proximity of the second user when the second user is determined to be the non-registered user.

7. The method of claim 1, further comprising:
   clearing a lock screen in response to a predetermined input from the first user, the image currently displayed on the display screen having been changed to the lock screen in response to the first user selecting to change the currently displayed image to the lock screen.

8. The method of claim 1, wherein sensing the proximity of the second user comprises:
   emitting a signal using at least one proximity sensor;
   receiving the signal reflected by the second user; and
   determining a distance from the device to the second user based on the received signal.

9. The method of claim 8, wherein sensing the proximity of the second user further comprises:
   determining that the second user is in proximity to the device when the distance from the device to the second user is less than a threshold distance.

10. A device, comprising:
    at least one proximity sensor configured to sense, while a first user views an image displayed by the device, a proximity of a second user, the first user being a registered user of the device;
    an iris recognition camera configured to generate first iris information by acquiring an image of an iris of the second user after the at least one proximity sensor senses the proximity of the second user;
    a control unit comprising a processor configured to receive the first iris information from the iris recognition camera, and to determine whether the second user is a registered user or a non-registered user of the device; and
    a display configured to display, when the second user is determined to be a non-registered user of the device, a user selection window indicating that the first user has an option to select whether to change a currently displayed image, and changing the currently displayed image to a lock screen if the first user selects to change the currently displayed screen when the user selection window is displayed.

11. The device of claim 10, wherein the control unit is configured to compare the first iris information received from the iris recognition camera with second iris information stored in the device, to determine the second user to be the registered user when the first iris information matches the second iris information, and to determine the second user to be the non-registered user when the first iris information does not match the second iris information.

12. The device of claim 11, further comprising:
    a non-volatile memory device configured to store the second iris information.

13. The device of claim 10, wherein the control unit is configured to determine a distance from the device to the second user using the at least one proximity sensor.

14. The device of claim 13, wherein the control unit is configured to enter a security mode when the distance from device to the second user is less than a threshold distance.

15. The device of claim 10, wherein the at least one proximity sensor comprises a first proximity sensor disposed in a top region of the device and a second proximity sensor disposed in a bottom region of the device.

* * * * *